UNITED STATES PATENT OFFICE 2,356,129

OLEFINIC POLYMERIZATION PROCESS AND PRODUCT

William J. Sparks, Elizabeth, and Robert M. Thomas, Union, N. J., assignors, by mesne assignments, to Jasco, Incorporated, a corporation of Louisiana No Drawing. Application August 30, 1941, Serial No. 408,992

22 Claims. (Cl. 260—79)

This invention relates to hydrocarbon polymers; relates particularly to interpolymers or copolymers of an isoolefin with a polyolefin; and relates especially to sulfurizable interpolymers of an isoolefin with a monomethyl substituted butadiene.

As shown in our copending application, Serial No. 182,252, it has been found possible to produce an interpolymer of an isoolefin such as isobutylene with a diolefin such as butadiene by a low temperature technique, utilizing an active metal halide, or Friedel-Crafts type, catalyst dissolved in a low freezing solvent. The resulting polymers have molecular weights ranging from 15,000 to 150,000 or above, and are reactive with sulfur in a curing reaction by which the elasticity of the polymer is largely destroyed and replaced by an elastic limit at which the material has a tensile strength ranging from 2,000 to 5,000 pounds per square inch and an elongation ranging from 300% to 1200%.

The resulting polymers are high grade materials suitable for replacement of natural rubber for many of its uses. The polymer does not, however, have all of the characteristics of natural rubber, nor all of the characteristics desirable for some particular uses, and, accordingly, means for modifying the characteristics of the material to adapt it to particular uses are important.

The present invention presents a new interpolymer, an interpolymer in which an isoolefin, preferably isobutylene, or, alternatively, 3-methyl butene-1, is interpolymerized with a monomethyl substituted butadiene by the application to a mixture of the isoolefin and the diolefin of a dissolved active metal halide, or Friedel-Crafts type, catalyst at low temperature between —40° C. and —125° C. or even to —165° C.

A preferred diolefin, according to the present invention, is isoprene (or 2-methyl butadiene-1,3) having the formula:

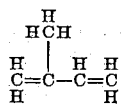

Alternatively, piperylene or pentadiene-1,3 (or 1-methyl butadiene-1,3) having the formula:

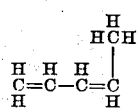

may be used. These two diolefins may be identified as the $C_5$ dienes, or compounds having the formula $C_5H_8$.

These diolefins polymerize readily with the isoolefins, as above outlined, and yield very valuable high molecular weight polymers, which are reactive with sulfur. They are solids, have iodine numbers within the range of 1 to 50, and molecular weights within the range of 15,000 to 150,000, or even higher, up to 300,000, and when cured with sulfur yield rubber-like substances which have elastic limits and tensile strengths at break ranging from 2,000 to 5,000 pounds per square inch, and elongations at break ranging from 500 to 1200%.

Thus an object of the present invention is to interpolymerize an isoolefin such as isobutylene with a methyl substituted conjugated diolefins such as isoprene or piperylene, to modify and improve the characteristics of a low temperature rubbery interpolymer. Other objects and details of the invention will be apparent from the following description.

In practicing this invention, an olefinic mixture is prepared, consisting of the isoolefin, preferably isobutylene, with the diolefin, which may be either isoprene or piperyline; the isoolefin preferably being present in the ratio of from 80 to 99 parts, with the diolefin in a proportion of 20 to 1 part. This olefinic mixture is preferably diluted with a diluent-refrigerant such as liquid ethylene or liquid ethane or liquid methane or mixtures of these several diluent-refrigerants together with other inert diluents such as liquid propane, liquid butane, liquid ethyl or methyl chlorides and the like, the diluent-refrigerant being present in the proportion of from 2 to 5 or 6 volumes per volume of mixed olefins. Alternatively, an excess of solid carbon dioxide may be utilized either with or without an auxiliary diluent such as propane, ethyl or methyl chloride or similar inert, low freezing substances. If desired, external cooling may be used, the reaction mixture being circulated rapidly past a cooling surface, such as a series of tubes submerged in a convenient refrigerant.

The catalyst preferably consists of a solution of an active metal halide such as aluminum chloride, bromide or iodide or uranium or titanium chloride dissolved in a low freezing solvent such as ethyl or methyl chloride or liquid carbon dioxide or similar homologous substance. The catalyst solution is preferably applied in the form of a spray or mist on to the surface of the rapidly stirred mixture of the olefins and diluent-refrigerant. The reaction proceeds rapidly to produce the desired solid, plastic, elastic polymer.

The preferred diluent-refrigerant is liquid ethylene, but superior interpolymers are produced from some of the above indicated reactants by the use of lower temperatures than the —98° C. to —103° C. which is obtainable by liquid ethylene. For this purpose, liquid methane or mixtures of liquid methane and liquid ethylene are preferably used with temperatures ranging from —110° down to the minimum temperature obtainable with liquid methane in the neighborhood of −161° C. At temperatures below −100° C. care must be used in regard to the catalyst solution, the solution being chilled before use only to a temperature above its melting point before application to the mixed olefins preferably through a spray nozzle.

The polymer may be combined with sulfur and appropriate fillers, plasticizers and the like, and suitable sulfurization aids such as "Tuads" (tetramethyl thiuram disulfide). The polymer, when so compounded, is cured into an elastic, rubberlike substance having an elastic limit, a high tensile strength and a high elongation by the application of heat within a temperature range of 135° C. to 185° C. for a time interval ranging from 15 to 120 minutes.

EXAMPLE 1

A mixture of 99 parts of liquid isobutylene was prepared with one part of piperylene and 4 volumes of liquid ethylene were added to the mixed olefins. The mixture was prepared in a reactor equipped with a powerful stirring device and provided with a cover to avoid loss of volatilized gaseous constituents. The reactor also was well heat insulated to reduce the rate of volatilization of the refrigerant by ambient heat. The catalyst was prepared by dissolving commercial anhydrous aluminum chloride in methyl chloride at the boiling point of the methyl chloride to yield a nearly saturated solution containing approximately 6% of aluminum chloride. This solution was then diluted with an additional amount of methyl chloride to produce a solution containing 0.5% of dissolved commercial aluminum chloride. This solution was then precooled to a temperature of about −78° C., and sprayed through a spray nozzle on to the surface of the vigorously stirred mixed olefins. The polymerization proceeded rapidly and was approximately 80% complete in about 5 minutes.

When this stage of polymerization was reached, the polymerization mixture was diluted with approximately ½ volume of isopropyl alcohol to quench the catalyst and to arrest the polymerization. The solid interpolymer was then brought up to room temperature, washed, and dried. It was then ready for compounding and curing.

This polymer was found to have a molecular weight of approximately 106,000 and a molecular per cent of unsaturation, as computed from the iodine number, of approximately 0.59%.

EXAMPLE 2

The interpolymer of isobutylene and piperylene was then compounded according to the following formula:

| | Parts |
|---|---|
| Interpolymer | 100 |
| Zinc oxide | 5 |
| Stearic acid | 3 |
| Sulfur | 3 |
| Tuads | 1 |

In preparing this compound, the interpolymer was worked briefly upon the mill for a time interval of approximately 5 minutes. Then the zinc oxide was added and thoroughly incorporated into the polymer by further working on the mill. Thereafter, the stearic acid and sulfur were simultaneously added, the mill temperature during this portion of the operation being maintained at approximately 140° C. When these ingredients were thoroughly incorporated, the mill was cooled to a temperature of approximately 40° C., the Tuads added quickly and the compound removed from the mill.

This prepared compound was then placed in a mold and cured at a temperature of 155° C. for 60 minutes to produce the desired cured rubberlike polymer. This cured compound was found to have a tensile strength of 3700 pounds per square inch and an elongation of approximately 1100% at break.

EXAMPLE 3

An olefinic mixture containing isobutylene in the proportion of 99 parts with the above mentioned isoprene in the proportion of 1 part, was prepared as in Example 1 and polymerized in the presence of liquid ethylene as a diluent-refrigerant by the application of a similar catalyst, to produce a high grade polymer having a molecular unsaturation of 0.75% and a molecular weight of 70,000. This material was compounded and cured as in Example 2, and was found to have a good tensile strength and a similarly high elongation.

The present invention is limited to the C5 conjugated diolefins shown. Many advantageous features are obtained by the use of these C5 conjugated diolefins instead of butadiene. The C5 conjugated diolefins interpolymerize very readily with the isoolefins, particularly with isobutylene; and interpolymerize in nearly the proportions in which they are present in the mixture, in sharp contrast to butadiene, which interpolymerizes with great difficulty and in much lower proportions than the proportion in which it is present in the mixture. Also, in the obtaining of a given proportion of interpolymerized diolefin in the polymer molecules, the C5 conjugated diolefins show a markedly lower poisoning effect thus making it possible to obtain an interpolymer of higher molecular weight.

Also, the C5 conjugated diolefins yield a polymer which when cured is of conspicuously high resistance to ozone and aging in general, in contrast to some of the other diolefins which yield material of lower resistance to ozone and oxidation.

These characteristics are well shown in the following table:

TABLE I

Characteristic properties of butyl rubber from various diolefins

| Per cent diolefin | Mol. weight | Mol. per cent unsat. | Tensile strength | | | Per cent elongation | | |
|---|---|---|---|---|---|---|---|---|
| | | | 20′ | 40′ | 60′ | 20′ | 40′ | 60′ |
| BUTADIENE (CONTROL) | | | | | | | | |
| 2.0 | 69,000 | 0.92 | 2,800 | 3,050 | 3,450 | 1,125 | 1,050 | 1,050 |
| ISOPRENE | | | | | | | | |
| 1.0 | 70,000 | 0.82 | 2,900 | 3,350 | 2,900 | 1,000 | 950 | 900 |
| 1.5 | 62,000 | 1.15 | 2,700 | 2,800 | 2,500 | 850 | 825 | 750 |
| 2.0 | 64,000 | 1.40 | 1,550 | 1,600 | 2,450 | 900 | 800 | 1,000 |
| 2.5 | 45,000 | 1.58 | 1,950 | 550 | 450 | 800 | 600 | 500 |
| 3.0 | | 1.65 | 1,100 | 350 | 400 | 750 | 525 | 525 |
| PIPERYLENE | | | | | | | | |
| 1.0 | 74,000 | 0.94 | 2,000 | 2,600 | 3,300 | 1,175 | 1,075 | 1,050 |
| 1.5 | 62,000 | 1.70 | 1,650 | 3,200 | 3,350 | 1,050 | 1,075 | 1,000 |
| 2.0 | 42,000 | 2.13 | 1,700 | 2,750 | 2,850 | 1,125 | 1,025 | 950 |
| 2.5 | 30,000 | 2.47 | 1,850 | 2,350 | 1,700 | 1,100 | 975 | 875 |
| 3.0 | 36,000 | 3.10 | 1,350 | 1,400 | 450 | 1,100 | 925 | 625 |

In this table the amount of the several diolefins added is given, together with the molecular weight obtainable, the molecule percentage of unsaturation, which is practically equivalent to the number of diolefin molecules per 100 molecules, the tensile strength and the percent elongation at break of the various cured stocks.

Thus the invention provides a new and useful interpolymer isoolefin with a $C_5H_8$ hydrocarbon, particularly in a methyl substitute butadiene in which the characteristics of the reaction are markedly simplified and improved by the presence of substitute butadienes as compared to the reaction occurring with simple butadiene.

The above examples show only the use of isoprene or piperylene alone but similar additives are obtained by the use of mixtures of these two $C_5H_8$ diolefins and in some instances equally valuable improvements are obtained by the use of methyl-component mixtures of other diolefins with either or both of the $C_5H_8$ diolefins.

This application is a continuation-in-part of our copending applications Serial No. 182,252 filed December 29, 1937, and Serial No. 300,336 filed October 20, 1939.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. The process of preparing a solid plastic hydrocarbon interpolymer which is reactive with sulfur to give an elastic product comprising the steps of reacting together a major proportion of an aliphatic isoolefin having 4 to 7, inclusive, carbon atoms per molecule, with a minor proportion of an aliphatic diolefin having 5 carbon atoms per molecule, at a temperature between 0° C. and −160° C. in the presence of a polymerization catalyst comprising a Friedel-Crafts catalyst dissolved in a solvent which forms no complex with the Friedel-Crafts catalyst and is liquid at the reaction temperature.

2. The process of preparing solid, plastic, hydrocarbon interpolymer comprising the step of reacting together a low molecular weight aliphatic isoolefin having less than 8 carbon atoms per molecule with a low molecular weight aliphatic diolefin having 5 carbon atoms per molecule in the presence of a Friedel-Crafts catalyst dissolved in a solvent which forms no complex with the Friedel-Crafts catalyst and is liquid at the reaction temperature, the reaction being conducted at a temperature below 0° C.

3. The process of preparing solid, plastic hydrocarbon interpolymer which is reactive with sulfur to give an elastic product comprising the step of reacting together a major proportion of isobutylene with a minor proportion of a low molecular weight aliphatic conjugated diolefin having 5 carbon atoms per molecule in the presence of a Friedel-Crafts catalyst dissolved in an organic solvent which forms no complex therewith and is liquid at the reaction temperature, the reaction being conducted at a temperature between 0° C. and −160° C.

4. The process of preparing solid, plastic hydrocarbon interpolymers which are reactive with sulfur to yield an elastic product comprising the step of reacting together a major proportion of isobutylene with a minor proportion of isoprene in the presence of a Friedel-Crafts catalyst dissolved in a solvent which forms no complex therewith and is liquid at the reaction temperature, the reaction being conducted at a temperature between 0° C. and −160° C.

5. The process of preparing solid, plastic hydrocarbon interpolymers which are reactive with sulfur to yield an elastic product comprising the step of reacting together a major proportion of isobutylene with a minor proportion of pentadiene in the presence of a Friedel-Crafts catalyst dissolved in a solvent which forms no complex therewith and is liquid at the reaction temperature, the reaction being conducted at a temperature between 0° C. and −160° C.

6. The process of preparing solid, plastic hydrocarbon interpolymers which are reactive with sulfur to yield an elastic product comprising the step of reacting together a major proportion of isobutylene with a minor proportion of isoprene in the presence of aluminum chloride dissolved in a solvent which forms no complex therewith and is liquid at the reaction temperature, the reaction being conducted at a temperature between −50° C. and −160° C.

7. The process of preparing solid, plastic hydrocarbon interpolymers which are reactive with sulfur to yield an elastic product comprising the step of reacting together a major proportion of isobutylene with a minor proportion of pentadiene in the presence of aluminum chloride dissolved in a solvent which forms no complex therewith and is liquid at the reaction temperature, the reaction being conducted at a temperature between −50° C. and −160° C.

8. The process of preparing solid, plastic, hydrocarbon interpolymers which are reactive with sulfur to give an elastic product comprising the step of reacting together a major proportion of isobutylene with a minor proportion of a low molecular weight aliphatic conjugated diolefin having 5 carbon atoms per molecule in the presence of aluminum chloride dissolved in an alkyl halide which forms no complex with the aluminum chloride and is liquid at the reaction temperature, the reaction being conducted at a temperature between 0° C. and −160° C.

9. The process of preparing solid, plastic, hydrocarbon interpolymers which are reactive with sulfur to give an elastic product comprising the step of reacting together a major proportion of isobutylene with a minor proportion of isoprene in the presence of aluminum chloride dissolved in an alkyl halide which forms no complex with the aluminum chloride and is liquid at the reaction temperature, the reaction being conducted at a temperature between 0° C. and −160° C.

10. The process of preparing solid, plastic, hydrocarbon interpolymers which are reactive with sulfur to give an elastic product comprising the step of reacting together a major proportion of isobutylene with a minor proportion of pentadiene in the presence of aluminum chloride dissolved in an alkyl halide which forms no complex with the aluminum chloride and is liquid at the reaction temperature, the reaction being conducted at a temperature between 0° C. and −160° C.

11. The process of preparing solid, plastic, hydrocarbon interpolymers which are reactive with sulfur to give an elastic product comprising the step of reacting together a major proportion of isobutylene with a minor proportion of isoprene in the presence of aluminum chloride dissolved in methyl chloride, the reaction being conducted at a temperature between −50° C. and −160° C.

12. The process of preparing solid, plastic, hydrocarbon interpolymers which are reactive with sulfur to give an elastic product comprising the step of reacting together a major proportion of isobutylene with a minor proportion of pentadiene in the presence of aluminum chloride dissolved in methyl chloride, the reaction being conducted at a temperature between —50° C. and —160° C.

13. The process of preparing solid, plastic, hydrocarbon interpolymers which are reactive with sulfur to give an elastic product comprising the step of reacting together a major proportion of isobutylene with a minor proportion of isoprene in the presence of aluminum chloride dissolved in carbon disulfide, the reaction being conducted at a temperature between —50° C. and —160° C.

14. The process of preparing cured, solid, elastic hydrocarbon interpolymers comprising the step of reacting together a major proportion of isobutylene with a minor proportion of isoprene in the presence of a Friedel-Crafts catalyst dissolved in an organic solvent which forms no complex therewith and is liquid at the reaction temperature, the reaction being conducted at a temperature between —50° C. and —160° C. and thereafter heating the polymer with sulfur and a sulfurization aid.

15. The process of preparing cured, solid, elastic hydrocarbon interpolymers comprising the step of reacting together a major proportion of isobutylene with a minor proportion of pentadiene in the presence of a Friedel-Crafts catalyst dissolved in an organic solvent which forms no complex therewith and is liquid at the reaction temperature, the reaction being conducted at a temperature between —50° C. and —160° C. and thereafter heating the polymer with sulfur and a sulfurization aid.

16. The process of preparing cured, elastic, hydrocarbon interpolymers comprising the step of reacting together a major proportion of isobutylene with a minor proportion of a low molecular weight, aliphatic, conjugated diolefin having 5 carbon atoms in the presence of a Friedel-Crafts catalyst dissolved in a solvent which forms no complex therewith and is liquid at the reaction temperature, the reaction being conducted at a temperature between —50° C. and —160° C., and thereafter heating the polymer with sulfur and a sulfurization aid comprising tetramethyl thiuram disulfide.

17. The process of preparing cured, elastic, hydrocarbon interpolymers comprising the step of reacting together a major proportion of isobutylene with a minor proportion of isoprene in the presence of a Friedel-Crafts catalyst dissolved in a solvent which forms no complex therewith and is liquid at the reaction temperature, the reaction being conducted at a temperature between —50° C. and —160° C., and thereafter heating the polymer with sulfur and a sulfurization aid comprising tetramethyl thiuram disulfide.

18. The process of preparing cured, elastic, hydrocarbon interpolymers comprising the step of reacting together a major proportion of isobutylene with a minor proportion of pentadiene in the presence of a Friedel-Crafts catalyst dissolved in a solvent which forms no complex therewith and is liquid at the reaction temperature, the reaction being conducted at a temperature between —50° C. and —160° C., and thereafter heating the polymer with sulfur and a sulfurization aid comprising tetramethyl thiuram disulfide.

19. A synthetic, solid, plastic, hydrocarbon interpolymer of a major proportion of an isoolefin having less than 8 carbon atoms per molecule with a minor proportion of diolefin having 5 carbon atoms per molecule, the said polymer being characterized by a low unsaturation below an iodine number of 50, a molecular weight above 15,000 and reactivity with sulfur to yield a product of increased elasticity.

20. A synthetic solid, plastic, hydrocarbon interpolymer of a major proportion of isobutylene with a minor proportion of a conjugated diolefin having 5 carbon atoms per molecule, the polymer being characterized by a low unsaturation below an iodine number of 50, a molecular weight above 15,000, and reactivity with sulfur to yield an elastic product.

21. A synthetic solid, plastic, hydrocarbon interpolymer of a major proportion of isobutylene with a minor proportion of isoprene, the polymer being characterized by a low unsaturation below an iodine number of 50, a molecular weight above 15,000, and reactivity with sulfur to yield an elastic product.

22. A synthetic solid, plastic, hydrocarbon interpolymer of a major proportion of isobutylene with a minor proportion of pentadiene, the polymer being characterized by a low unsaturation below an iodine number of 50, a molecular weight above 15,000, and reactivity with sulfur to yield an elastic product.

WILLIAM J. SPARKS.
ROBERT M. THOMAS.